US00RE43828E

(19) United States
(12) Reissued Patent
Tufano et al.

(10) Patent Number: US RE43,828 E
(45) Date of Reissued Patent: Nov. 27, 2012

(54) CEILING LAMPHOLDER TO ACCEPT A NON-INCANDESCENT LAMP

(75) Inventors: Anthony Tufano, North Massapequa, NY (US); Marc Noest, Westbury, NY (US); Emma Levin, Brooklyn, NY (US); James Richter, Bethpage, NY (US)

(73) Assignee: Leviton Manufacturing Co., Inc., Melville, NY (US)

(21) Appl. No.: 12/945,167

(22) Filed: Nov. 12, 2010

Related U.S. Patent Documents

Reissue of:
(64) Patent No.: 7,712,949
Issued: May 11, 2010
Appl. No.: 11/565,484
Filed: Nov. 30, 2006

U.S. Applications:
(60) Provisional application No. 60/741,992, filed on Dec. 2, 2005.

(51) Int. Cl.
*H01R 33/00* (2006.01)
*F21S 8/06* (2006.01)

(52) U.S. Cl. ..... 362/655; 362/652; 362/649; 362/404

(58) Field of Classification Search ..... 362/652–656, 362/649, 651, 394, 95, 404–408, 276, 433–458, 362/647
See application file for complete search history.

(56) References Cited

U.S. PATENT DOCUMENTS

D39,564 S 9/1908 Estep
D47,241 S 4/1915 Cosgrave
D57,574 S 4/1921 Bernecker
D74,527 S 2/1928 Von Nessen
D87,355 S 7/1932 Pospisil
2,145,787 A 1/1939 De Reamer
2,163,902 A 6/1939 Wertzheiser
D130,269 S 11/1941 Magnenat
2,284,376 A 5/1942 De Reamer et al.
2,298,824 A 10/1942 Darley
2,434,951 A 1/1948 Netting (Continued)

OTHER PUBLICATIONS

International Search Report for PCT Application No. PCT/US2006/061521 mailed on Apr. 2, 2008. 3 pages.

*Primary Examiner* — Bao Q Truong
(74) *Attorney, Agent, or Firm* — Collard & Roe, P.C.

(57) ABSTRACT

This invention is directed to a lampholder for receiving a non-incandescent lamp having a 2-pin base. A surface mountable member for receiving the lamp and which has no voltage transforming circuitry is disclosed. Each pin of the lamp has an enlarged cylindrical shaped end attached to a shaft of reduced diameter. The surface mountable member has two keyhole shaped apertures, each of which has a large circular end aperture and an arc shaped slot for receiving and securely holding the pins of the lamp to the surface mountable member. The circular aperture of each keyhole shaped aperture has a diameter which is slightly larger than the diameter of the enlarged cylindrical end of the lamp pin, and the arc shaped slot has a width that is both smaller than the diameter of the cylindrical end of the lamp pin and wider than the diameter of the shaft of the pin. The enlarged ends of the pins of the lamp, when located in the arc shaped slots, prevent the lamp from being pulled out of the surface mountable member.

22 Claims, 12 Drawing Sheets

U.S. PATENT DOCUMENTS

| | | | | |
|---|---|---|---|---|
| 2,449,394 | A | 9/1948 | Kulka | |
| D151,314 | S | 10/1948 | Adams et al. | |
| 2,511,155 | A * | 6/1950 | Gaynor | 439/231 |
| 2,595,520 | A | 5/1952 | Guerin | |
| 2,684,470 | A | 7/1954 | Cataldo | |
| D177,294 | S | 3/1956 | Willis | |
| 2,973,500 | A | 2/1961 | Pistey | |
| D197,530 | S | 2/1964 | Jaffe et al. | |
| 3,225,185 | A | 12/1965 | Bertolini et al. | |
| 3,511,179 | A | 5/1970 | Breunig | |
| 4,198,109 | A | 4/1980 | Ustin | |
| 4,812,827 | A | 3/1989 | Scripps | |
| 4,974,131 | A | 11/1990 | Paradiso | |
| 5,258,899 | A | 11/1993 | Chen | |
| D343,471 | S | 1/1994 | Belisle et al. | |
| D348,249 | S | 6/1994 | Hester | |
| 5,541,826 | A | 7/1996 | Sandell et al. | |
| D385,643 | S | 10/1997 | Brohard et al. | |
| D388,395 | S | 12/1997 | Henrici | |
| D392,407 | S | 3/1998 | Johnson et al. | |
| 5,765,939 | A | 6/1998 | Tanner, Jr. | |
| D399,820 | S | 10/1998 | Henrici | |
| D403,100 | S | 12/1998 | Bartasevich et al. | |
| 5,842,780 | A | 12/1998 | Causby et al. | |
| D406,814 | S | 3/1999 | Henrici | |
| D417,653 | S | 12/1999 | Henrici | |
| D420,326 | S | 2/2000 | Henrici | |
| D424,230 | S | 5/2000 | Noh | |
| 6,159,029 | A | 12/2000 | Burwell et al. | |
| 6,163,264 | A | 12/2000 | Birch et al. | |
| D448,096 | S | 9/2001 | Choi | |
| 6,326,731 | B1 | 12/2001 | Robinson et al. | |
| 6,390,647 | B1 * | 5/2002 | Shaefer | 362/276 |
| 6,488,386 | B1 * | 12/2002 | Yan | 362/216 |
| 6,547,411 | B1 | 4/2003 | Dornbusch | |
| D491,890 | S | 6/2004 | Henrici et al. | |
| D509,007 | S | 8/2005 | Shimada | |
| 7,033,065 | B2 * | 4/2006 | Leung et al. | 362/655 |
| 7,175,300 | B1 | 2/2007 | Medeiros | |
| 7,232,242 | B2 | 6/2007 | Isoda et al. | |
| D550,884 | S | 9/2007 | Tufano et al. | |
| D567,401 | S | 4/2008 | Mason, II | |
| D577,854 | S | 9/2008 | Tufano et al. | |
| 2005/0075007 | A1 | 4/2005 | Benoit et al. | |
| 2005/0185396 | A1 | 8/2005 | Kutler | |
| 2005/0231951 | A1 * | 10/2005 | Hirsch et al. | 362/260 |

* cited by examiner

CEILING LAMPHOLDER TO ACCEPT A NON-INCANDESCENT LAMP

Matter enclosed in heavy brackets [ ] appears in the original patent but forms no part of this reissue specification; matter printed in italics indicates the additions made by reissue.

This application claims the benefit of Provisional Application No. 60/741,992 filed Dec. 2, 2005.

BACKGROUND OF THE INVENTION

1. Field of the Invention

The present invention relates generally to lampholders and more specifically to a wall or ceiling mountable lampholder for a non-incandescent lamp having two pins.

2. Description of the Prior Art

A typical lamp holder of the known prior art which can include a switch includes a body member having a central bore which extends through the body member. A threaded screw shell, which may be connected to a switch, is inserted through the rear surface of the body member such that the threaded screw shell extends through the central bore with a major portion extending outward beyond a neck of reduced diameter into the area being illuminated. An internally threaded cap is screwed over the exposed end portion of the threaded screw shell to anchor the switch and screw shell in position and electrically insulates the exposed end portion of the threaded screw shell. Since the threaded screw shell is metal and the cap is of an insulating material such as porcelain, the external screw thread of the threaded screw shell and the internal threads of the cap do not closely match making assembly in the field difficult. Also, if the adjoining surfaces of the cap and neck of the body member which defines the bore are not flat, the cap may not sit properly on the threaded screw shell. In addition, the rear surface of the lamp holder is normally flat and, therefore, all parts of the lamp holder extend outward a considerable distance from the wall or ceiling surface to which it is mounted and into the area being illuminated.

In another prior art lamp holder, a body member is formed with a recess or cavity in its rear surface to accept a switch assembly and a neck extending from its front surface with a central bore therethrough within which is placed a threaded screw shell. An annular ring is placed in the central bore adjacent its intersection with the recess. The switch assembly is placed in the recess and against one surface of the annular ring. A threaded screw shell is introduced via the central bore to engage the opposite surface of the annular ring. Fasteners are used to join the switch assembly to the threaded screw shell by trapping the annular ring between them. The switch assembly is larger than the central bore and, therefore, cannot be removed via the central bore. Tabs which extend outward from the threaded screw shell engage recesses in the face of the annular ring to prevent the thread screw shell being removed form the body member via the rear recess.

Each of the prior art lampholders described above includes a substantially flat rear surface adapted to be mounted to an outlet box mounted in a wall or a ceiling, and a neck which extends substantially outwardly from the front surface and having a threaded screw shell located within the outwardly extending neck. Elimination of the extending neck and threaded screw shell will result in a lamp holder that is more economical to produce, less obtrusive and less prone to breakage. In addition, the body member of the prior art lamp holders is normally slightly larger than the diameter of the wall box to which it is mounted and, therefore, the wall or ceiling surface must be closely fitted to the outlet box to avoid cosmetic repairs.

A more compact lampholder which avoids some of the above noted problems and which can receive a lamp which is more efficient to operate such as a non-incandescent lamp is desired.

SUMMARY OF THE INVENTION

This invention is directed to a ceiling mountable lampholder for receiving a non-incandescent Lamp having a 2-pin base. Each pin of the lamp has an enlarged cylindrical shaped end attached to a shaft of reduced diameter. The mountable member can be a shallow slightly bowed disc shaped member with no voltage transforming circuitry and having a centrally located cavity for receiving a lamp with a 2-pin base is disclosed. The shallow disc shaped member has two keyhole shaped apertures, each of which has a circular end aperture and an arc shaped slot for receiving and securely holding the pins of the lamp to the disc shaped body member. The circular aperture of each keyhole shaped aperture has a diameter which is slightly larger than the diameter of the enlarged cylindrical end of the lamp pin, and the arc shaped slot has a width that is both smaller than the diameter of the cylindrical end of the lamp pin and wider than the diameter of the shaft of the pin. The enlarged ends of the pins of the lamp, when located in the arc shaped slots, prevent the lamp from being pulled out of the disc shaped body member. Located behind the key hole shaped apertures are two flat electrical contacts which are aligned with the key hole shaped apertures and positioned to contact the pins on the lamp as the pins are inserted into the circular end apertures and rotated in a clock wise direction into the arc shaped slots. In an embodiment where the shallow disc shaped member has a centrally located cavity for receiving the lamp, the disc shaped member can have a depth that extends beyond the rear plane of the disc shaped member and, when mounted to an outlet box, extends into the volume of the outlet box. The diameter of the disc shaped member is greater than the diameter of the outlet box to provide additional wall coverage in the event that the opening in the wall or ceiling is not closely sized to the outlet box.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
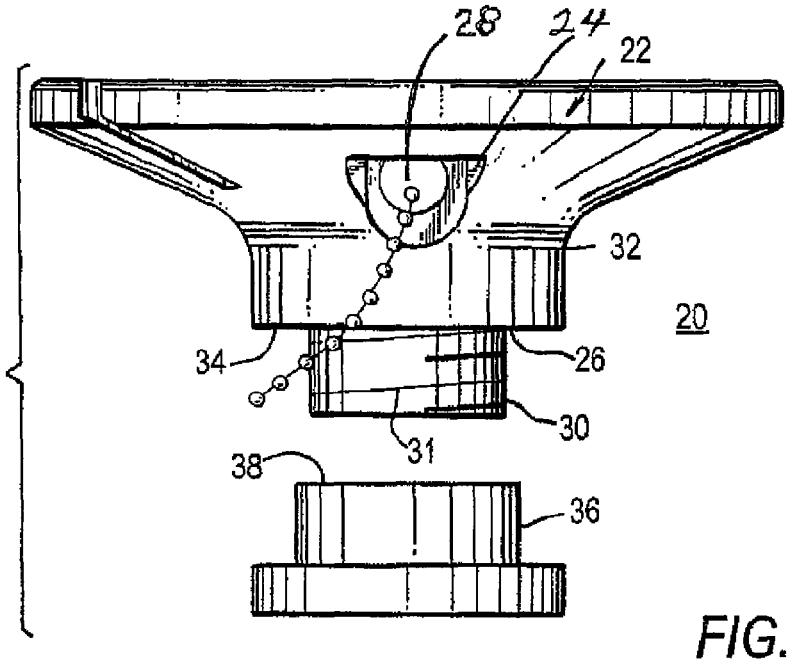
FIG. 1 PRIOR ART
FIG. 1 is an exploded side elevation view of a lampholder for installation upon an outlet box according to the prior art.
Figure 2:
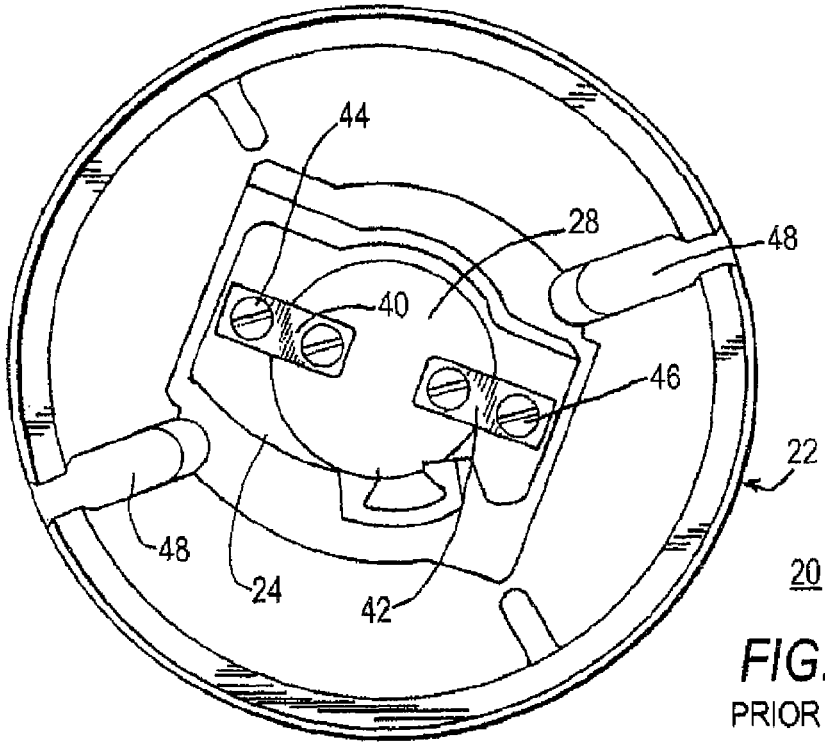
FIG. 2 PRIOR ART
FIG. 2 is a rear plan view of the lampholder of FIG. 1.

Referring to FIGS. 1 and 2, there is shown a lampholder 20 according to the prior art. A body member 22 composed of an insulating material such as porcelain or the like has a recess or cavity 24 which communicates with a central bore 26. A pull chain switch assembly 28 is positioned in the recess 24 with attached threaded screwshell 30 extending through bore 26 and beyond the end 34 of neck 32. A cap 36, having a central bore which is internally threaded is screwed onto the external threads 31 of the threaded screwshell 30 to hold the switch assembly body member 28 and screwshell 30 in the body member 22. In a properly matched unit, the top surface 38 of cap 36 will engage end 34 of neck 32 and there will be no gaps through which the screwshell 30 will be exposed and the switch assembly 28 will be fully seated in the recess 24. Referring to FIG. 2, contact strips 40, 42, each of which contains a terminal screw 44, 46 are provided to be connected to electrical conductors which are located in an electric outlet box.

During installation, the cap 36 is removed and the body member 22 is separated from the switch assembly 28 and threaded screwshell 30. Separating the body member 22 from the switch assembly 28 and screwshell 30 gives the installer a much lighter element to support. Electrical conductors are then attached, one to terminal screw 44 and the other to terminal screw 46. Threaded screwshell 30 with switch assembly 28 attached is now inserted into the body member and the cap 36 is screwed on to the exposed portion of the screwshell 30 which extends beyond end 34 of neck 32. The installer now mounts the lampholder by holding the assembled lampholder 20 in place while he inserts fasteners through slots 48 in the body member and threads them into apertures in the ears of an outlet box.

Figure 3:
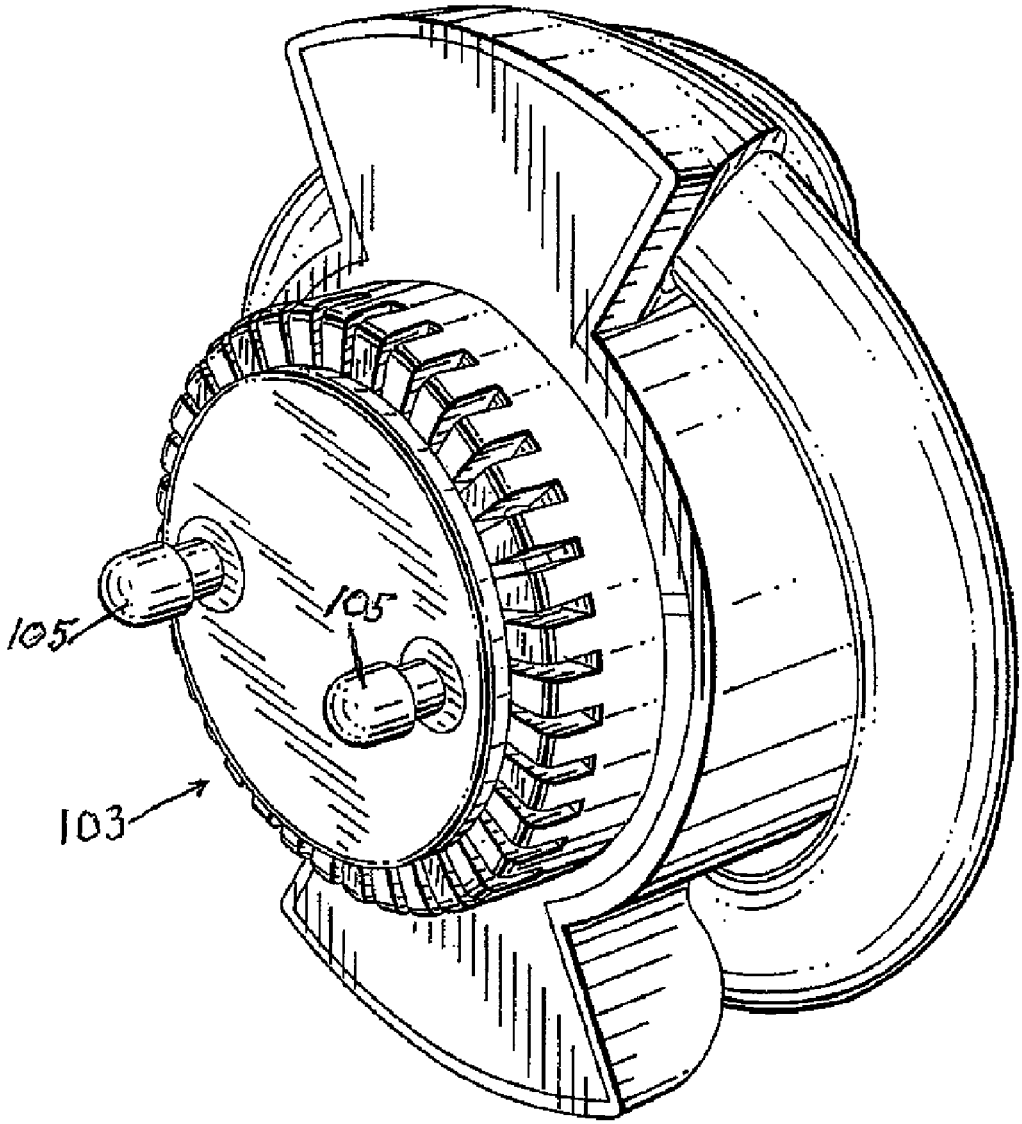
FIG. 3 is a bottom perspective view of a Compact Fluorescent Lamp which can also be referred to as a non-incandescent lamp having two pins.
Figure 4:
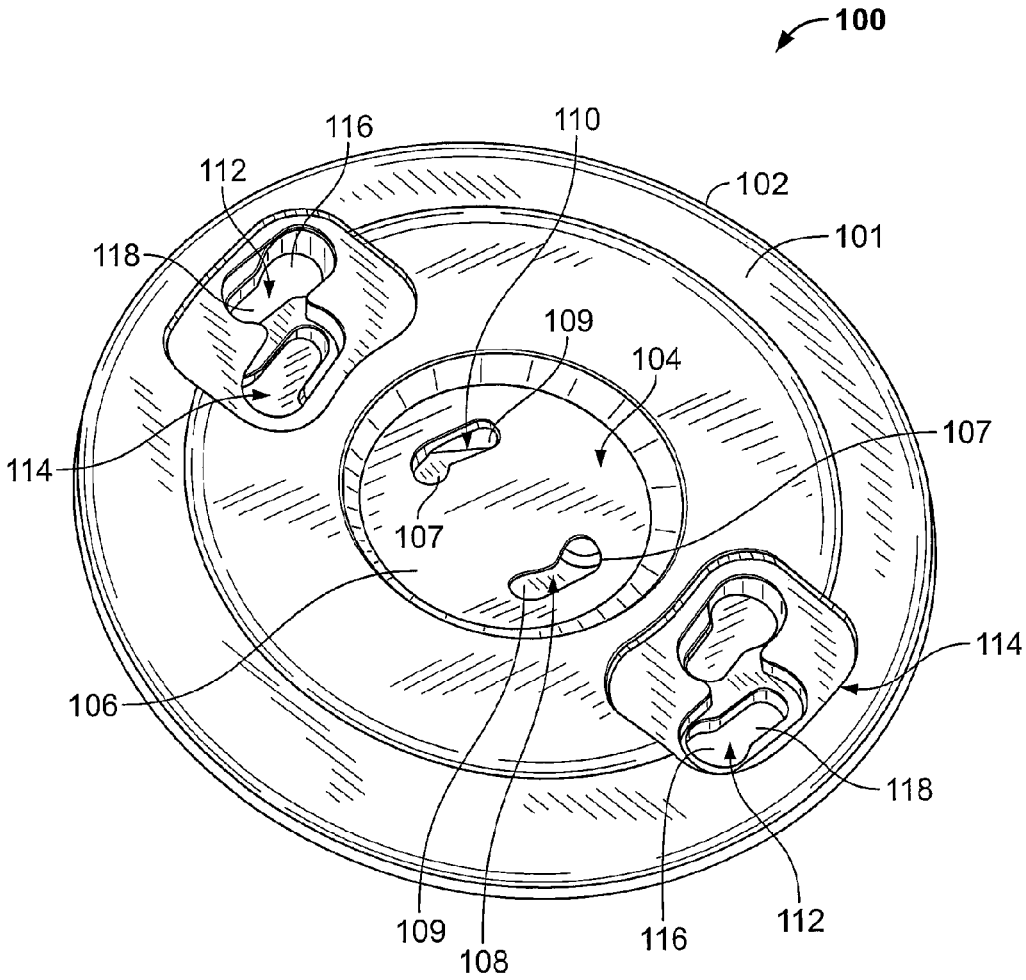
FIG. 4 is a front perspective view of a lampholder having a cavity for receiving a lamp.

Referring to FIG. 4, there is shown an embodiment of a lampholder 100 constructed in accordance with the principles of the invention. A surface mountable seat such as disc shaped body member 101 formed of insulating material which can be porcelain, plastic, rubber or the like is formed with a downwardly extending rim 102, the edge of which can extends below the rear surface of the body of the disc shaped member. Centrally located in the top surface of the disc shaped member is a recess or cavity 104 having a bottom member 106 which can extend below the rear surface of the disc shaped body member and below the plane formed by the edge of the rim 102. The cavity 104 has a diameter which is slightly larger than the diameter of the base of a Compact Fluorescent Lamp such as, for example, 13 Watt 120 Volt compact fluorescent lamp manufactured by VIVA, a rear perspective view of which is shown in FIG. 3. The diameter of the cavity 104 is slightly larger than the diameter of the base of the compact fluorescent lamp and the bottom member 106 of the cavity has two keyhole shaped apertures 108, 110 for receiving and holding the two contact pins 105 which protrude from the base of the compact fluorescent lamp.

Each pin of the lamp has an enlarged cylindrical shaped end attached to a shaft of reduced diameter. The bottom surface of the cavity 104 has two keyhole shaped apertures 108, 110, each of which has a large circular end aperture 107 and an arc shaped slot shaped aperture 109 for receiving and securely holding the pins of the lamp to the disc shaped body member. The circular apertures 108, 110 of the keyhole shaped apertures have a diameter which is slightly larger than the diameter of the enlarged cylindrical end of the lamp pin, and the arc shaped slot has a width that is both smaller than the diameter of the cylindrical end of the lamp pin and wider than the diameter of the shaft of the pin. The enlarged ends of the pins of the lamp, when located in the arc shaped slots, prevent the lamp from being pulled out of the disc shaped body member. Located below the key hole shaped apertures is a chamber having two flat electrical spring contacts which are aligned with the key hole shaped apertures and positioned to contact the pins on the lamp when the pins of the lamp are inserted into the circular end apertures and rotated in a clock wise direction into the arc shaped slots. In the embodiment of FIG. 4 where the shallow disc shaped body has a centrally located cavity for receiving the lamp, the cavity can have a depth that extends beyond the rear plane of the disc shaped body member and, when mounted to an outlet box, the cavity can extend into the volume of the outlet box. The diameter of the disc shaped body member is greater than the diameter of the outlet box to provide additional wall coverage in the event that the opening in the wall or ceiling is not closely sized to the outlet box.

Continuing with FIG. 4, two sets of keyholes 112, 114, are located on different centers to accept mounting screws for mounting the body member to different size outlet boxes. Keyholes 114 are for mounting the lampholder to a three and one-quarter inch electric outlet box, and keyholes 112 are for mounting the lampholder to a four inch electric outlet box. The heads of the screws, when tightened, are below the top surface of the disc shaped member 100. Normally the outlet box has mounting screws which are provided by the manufacturer and are threaded partially into the mounting ears of the outlet box. Therefore, to attach the lampholder to the outlet box, the large end apertures 116 of keyholes 112 are placed over the screw heads of a four inch outlet box, pushed down toward the box until the screw heads pass through the large end apertures, and is then rotated clockwise to position the threaded bodies of the screws into elongated slots 118. The screws are tightened to complete the assembly of the lampholder 100 to the electric outlet box. For a three and one-half inch electric outlet box, the procedure for mounting the disc is similar, except the orientation of the keyholes are reversed and, therefore, the lampholder is rotated in a counterclockwise direction when being attached to an outlet box.

Figure 5:
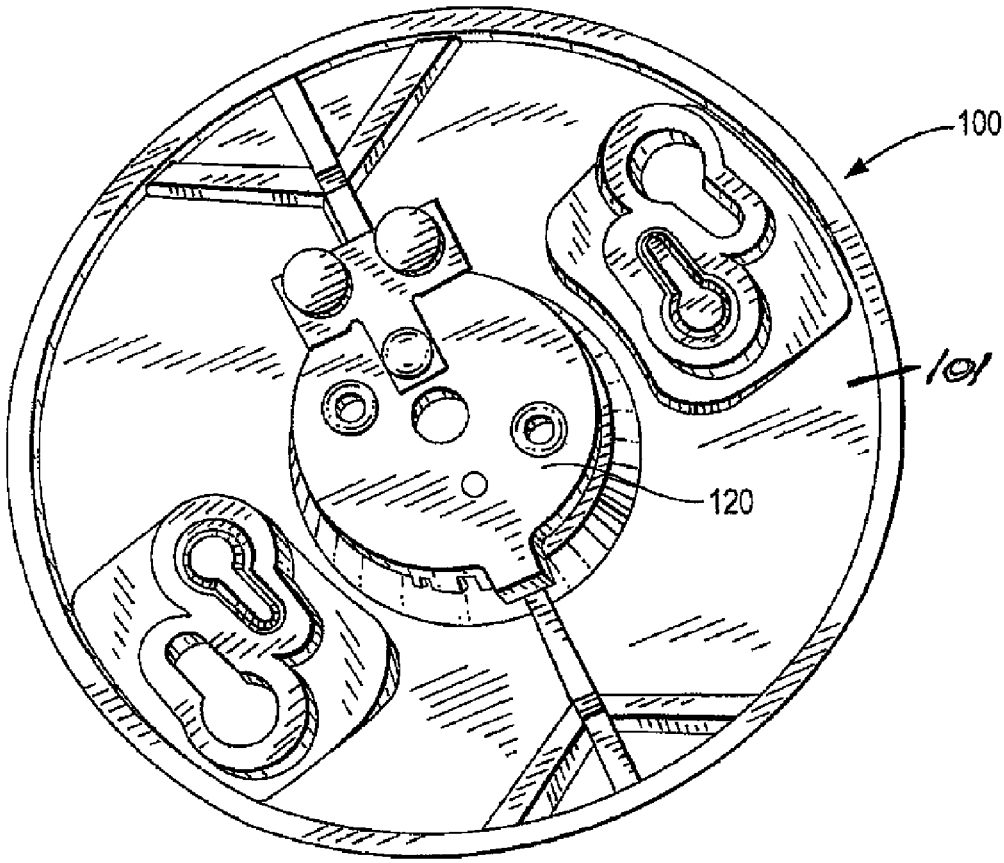
FIG. 5 is a rear perspective view of the lampholder of FIG. 4.
Figure 6:
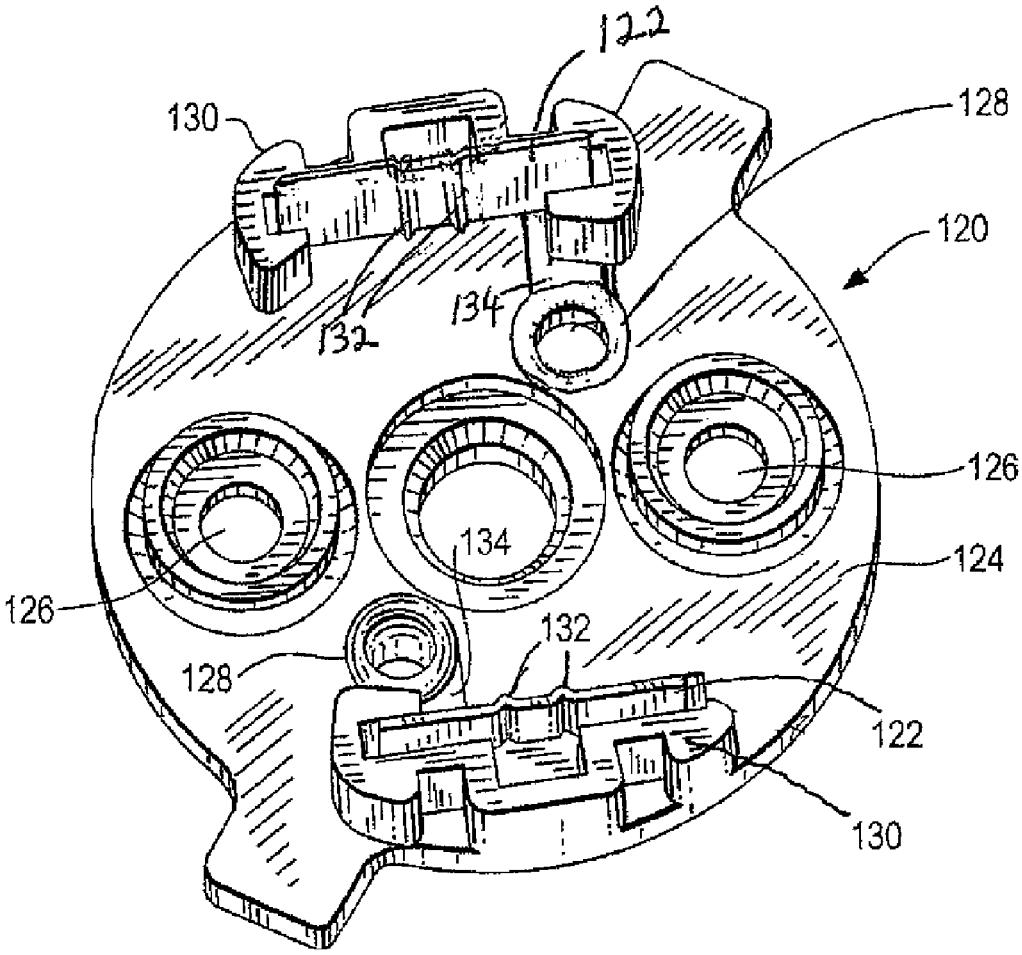
FIG. 6 is a top perspective view of the electrical contact support member with electrical contacts.

Referring to FIG. 5, there is shown a rear perspective view of the lampholder of FIG. 4. Attached to the bottom surface of the lampholder with adhesive, rivets or any convenient means is a disc shaped terminal mounting member 120 which is provided to support electrical spring contacts positioned to engage the pin contacts of a fluorescent lamp. FIG. 6 is a view of the top side of the disc shaped terminal mounting member 120 showing the electrical contact support members 130 and the electrical contacts positioned in the support members.

Referring specifically to FIG. 6, terminal mounting member 120 is located below the two keyhole shaped apertures in the bottom member 106 and is spaced from the bottom member by a distance sufficient to allow the contact pins of a compact fluorescent lamp to be inserted fully into the large circular end apertures 107 of keyhole shaped apertures 108, 110 and rotated clockwise along the arc shaped slots 109. Terminal mounting member 120 is composed of an insulating plastic material having two spaced apart openings 126 for receiving mounting screws, two spaced apart openings 128 for receiving electrically conductive eyelet rivets and two contact support members 130 for receiving two flat electrical spring contacts 122 located to engage the pins of a compact fluorescent lamp.

The contact support members 130 are an integral part of the terminal mounting member 120 and are configured to loosely hold captive the flat electrical spring contacts 122. The support members have a thickness which allows the pins of the lamp to be inserted into the keyhole shaped apertures 108, 110 and engage the spring contacts without binding or contacting the surface of the terminal mounting member. Contacts 122 are composed of flexible conductive material such as phosphor bronze or the like and each contact has two space apart ridges 132 and a conductive holding arm 134 which is angled outward and has an aperture for receiving a rivet 128. When the flat electrical spring contacts 122 are positioned in the contact support members 130 as shown in FIG. 6, the aperture located at the free end of conductive holding arm 134 is aligned with opening in the terminal mounting member 120 and is securely fastened to the terminal mounting member with eyelet rivet 128 composed of conductive material. Each flat electrical contact 122 is loosely supported by a contact support member 130 and can flex slightly as the pin of a compact fluorescent lamp passes over a ridge 132. The spring action of the contacts pressing on the lamp pins when they are located within the arc shaped slots 108, 109 together with the blocking action of the ridges 132 on the contact springs holds the pins in position to help lock the lamp to the lampholder.

Continuing with FIG. 6, during assembly, the flat electrical contacts 122 are placed into the contact support members 130 with ridges 132 facing toward the center of the terminal mounting member 120 and the opening at the end of conductive holding arm 134 being aligned with the opening for rivet 128. An eyelet rivet is now used to lock the conductive arm and flat electrical contact to the support member. A machine screw (not shown) is now placed into the eye of the eyelet rivet 128 and locked in position by placing a nut around the protruding end of the screw and tightening the screw. Prior to tightening the screw, a conductive wire is placed under the nut. The terminal mounting member 120 is now placed onto the back of the disc shaped body member (see FIG. 5) with the flat electrical contacts being aligned with the large end aperture 107 and arc shaped slots 109 of the keyhole shaped apertures, and is secured to the disc shaped body member with screws inserted into openings 126 and thread into plastic support columns which are a part of the disc shaped member and can be formed when the disc shaped member is formed.

After the lampholder is assembled and attached to an outlet box, the terminal mounting member 120 which extends out from the bottom projects into the volume of the electric outlet box to provide a lampholder that is more shallow than existing incandescent ceiling lampholders. In addition, the disc shaped body member 101 of the lampholder has a diameter of between four and one-half and five and one-half inches, where a diameter of substantially 5 inches, which is greater than the diameter of prior art lampholders, is preferred. This diameter size provides a lampholder which can be more forgiving because it can cover a space between an electric outlet box and a wall or ceiling where the opening in the wall or ceiling is not closely sized to the outlet box.

The above disclosed lampholder, in addition to being only a receptacle for a fluorescent lamp, can also include and be used in combination with additional structures such as a switch, a receptacle, a GFCI, an occupancy sensor, and/or a cover for the fluorescent lamp.

Figure 7:
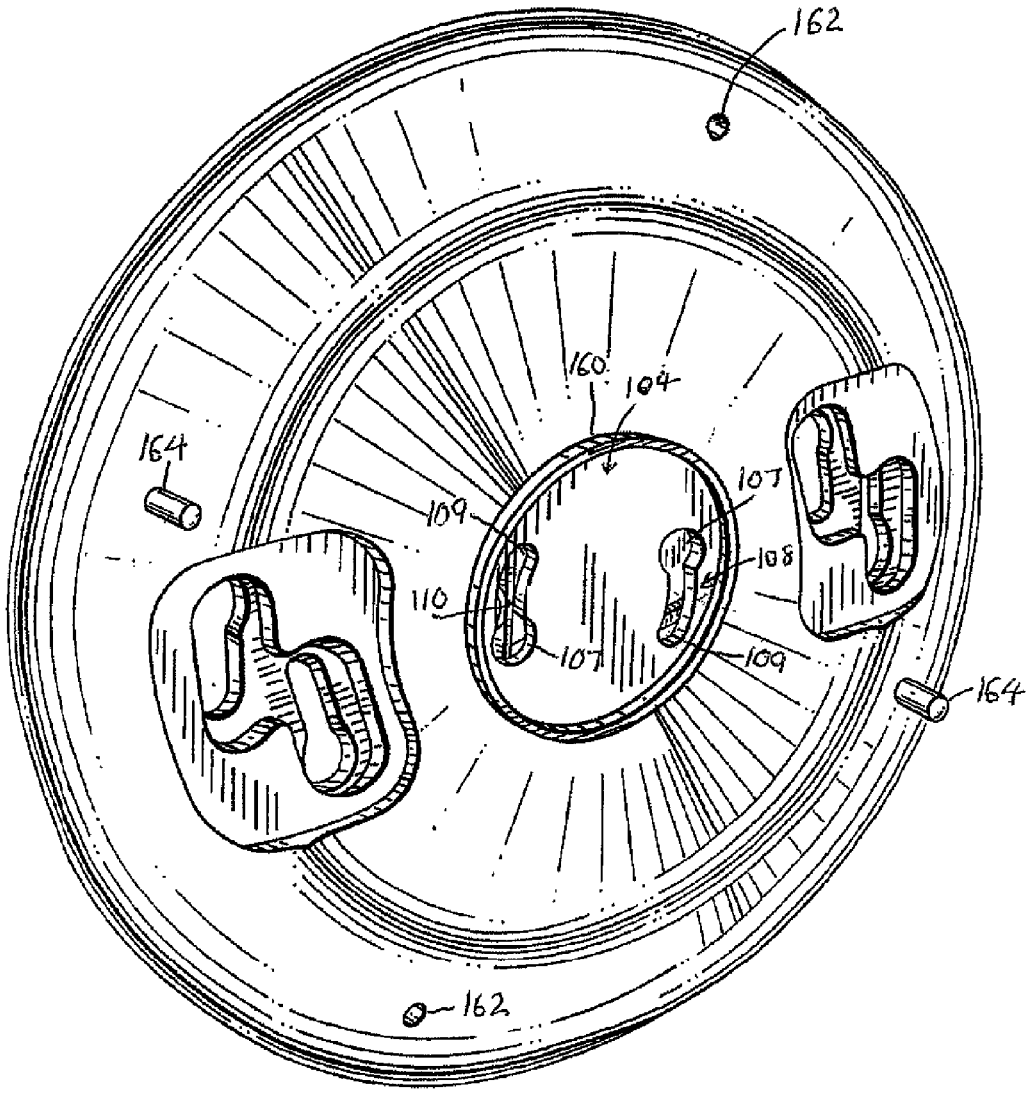
FIG. 7 is a top perspective view of another embodiment of the invention.

Referring to FIG. 7, there is shown a top perspective view of another embodiment of the invention where the recess or cavity located in the top surface of the disc shaped body member for receiving a lamp is absent. In this embodiment, a ring 160 is provided which encircles the keyhole shaped apertures and has a diameter which is smaller than the diameter of the base of the Compact Fluorescent Lamp. When the lamp is coupled to the lampholder, the lamp sits on the ring. It is to be understood, however, that the embodiment of FIG. 7 may not have a ring. The ring shown in FIG. 7 can have a height which can vary from one sixty-forth of an inch to one quarter of an inch, more or less. The pins of the lamp must contact the spring contacts 122 (see FIG. 6) located below the top surface of the lampholder. Therefore, the ring should have a height which allows the pins of the lamp to make contact with the spring contacts 122 when the lamp is seated in the lampholder. The top surface or face of the lampholder is slightly bowed and has a substantially continuous surface. The surface of the lampholder on each side of the ring lies in the same plane. In some applications it may be desirable to cover the lamp with a lamp shade. To provide for this application, apertures 162 can be provided in the lampholder to receive screws which can be used to attach a lamp shade to the lampholder and pins 164 which project out from the lampholder can be used to orient a lamp shade. In other respects, the lampholder of FIG. 7 is substantially similar to the lampholder of FIGS. 4-6 and, therefore, in the interest of brevity, a description of the various common parts of the lampholder will not be repeated.

Figure 8:
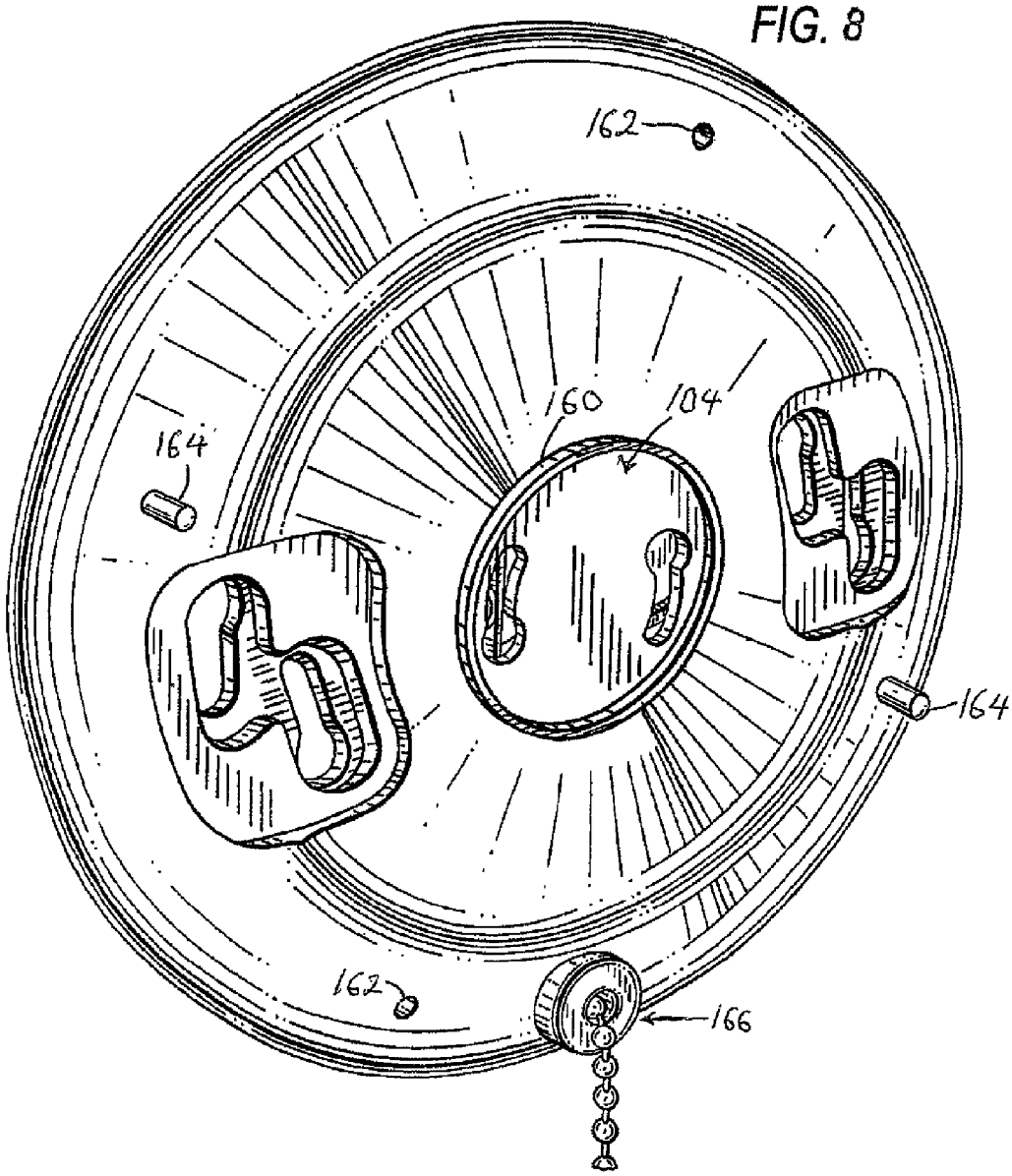
FIG. 8 is a top perspective view of the lampholder of FIG. 7 with a switch.

Referring to FIG. 8, there is disclosed a top perspective view of the lampholder of FIG. 7 with a switch 166. Switch 166 can be a pull chain switch used to turn a lamp located in the lampholder on and off.

Figure 9:
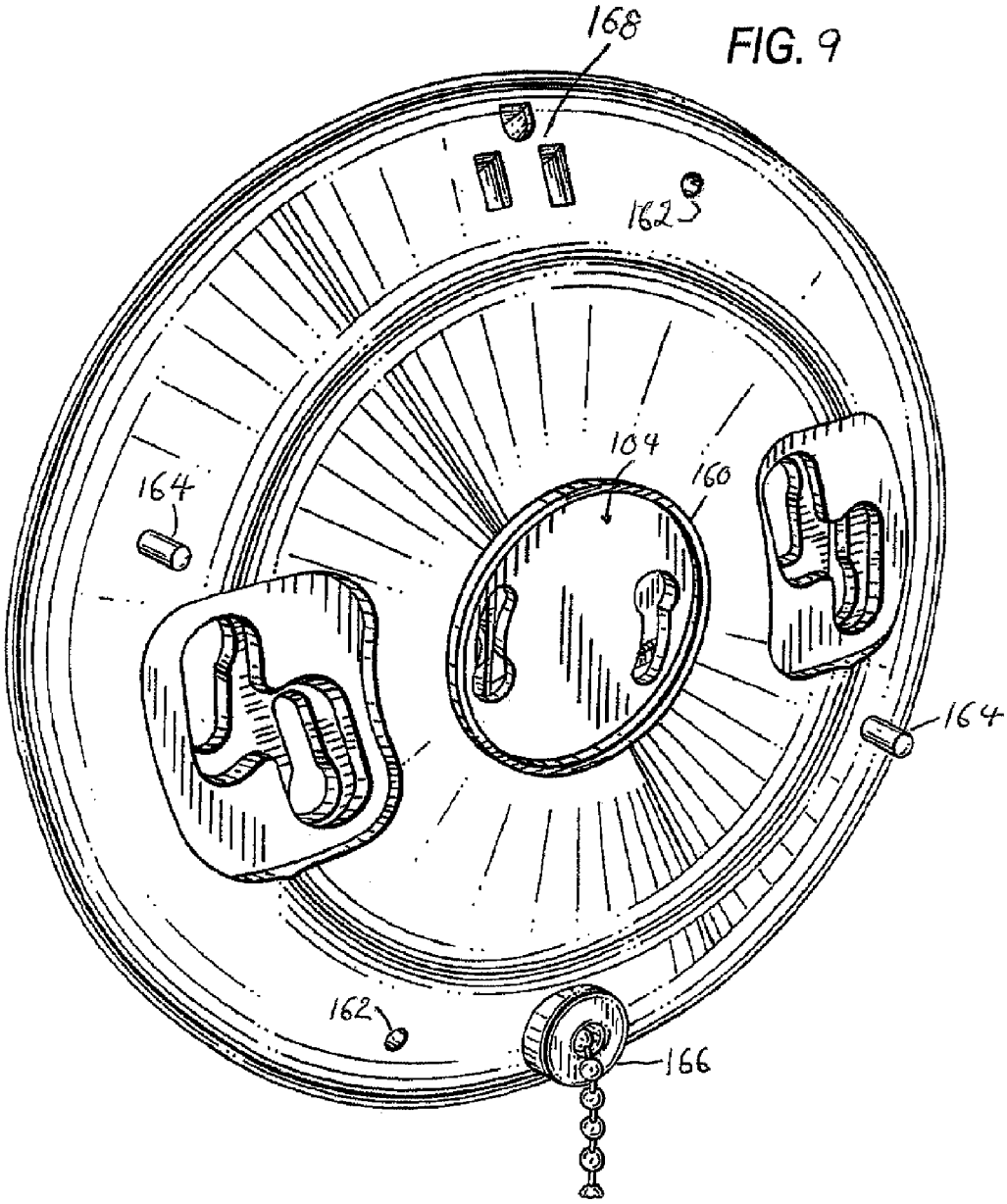
FIG. 9 is a top perspective view of the lampholder of FIG. 7 with a switch and a grounding receptacle.

Referring to FIG. 9, there is disclosed a top perspective view of the lampholder of FIG. 7 with a switch 166 and a grounding receptacle 168. Switch 166 can be a pull chain switch used to turn a lamp in the lampholder on and off, and the grounding receptacle is provided as a convenience receptacle. The receptacle can be connected to be continuously on, or it can be connected to be turned on and off by the switch.

Figure 10:
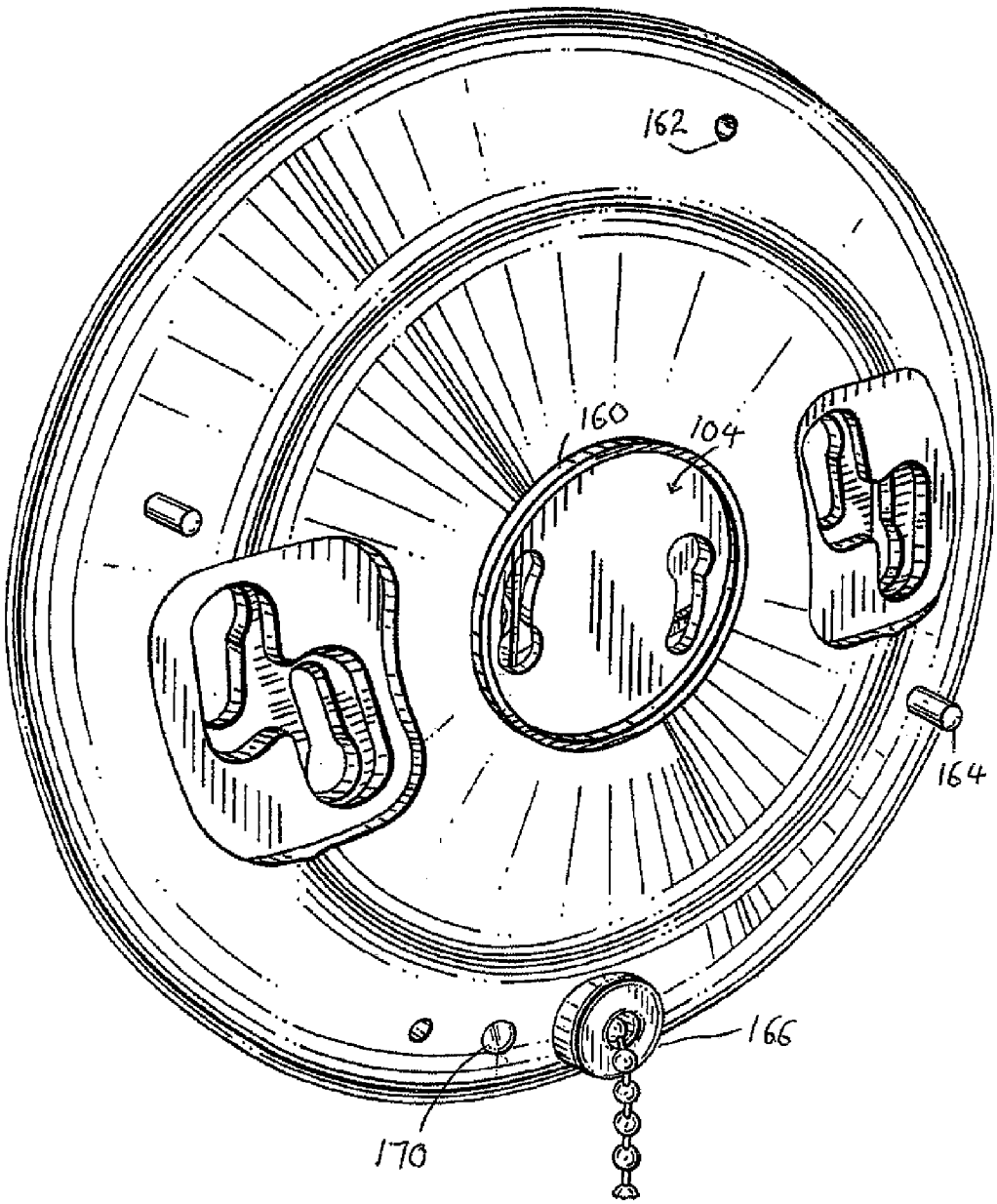
FIG. 10 is a top perspective view of the lampholder of FIG. 7 with a switch and a locator light.

Referring to FIG. 10, there is disclosed a top perspective view of the lampholder of FIG. 7 with a switch 166 and a locator light 170. Switch 166 can be a pull chain switch used to turn a lamp in the lampholder on and off and the locator light is connected to be on continuously. The locator light helps a user to locate the pull chain of the switch in a dark area.

For the purpose of clarity, the reference numerals of only those parts which are new in FIGS. 8-11 are shown.

Figure 11:
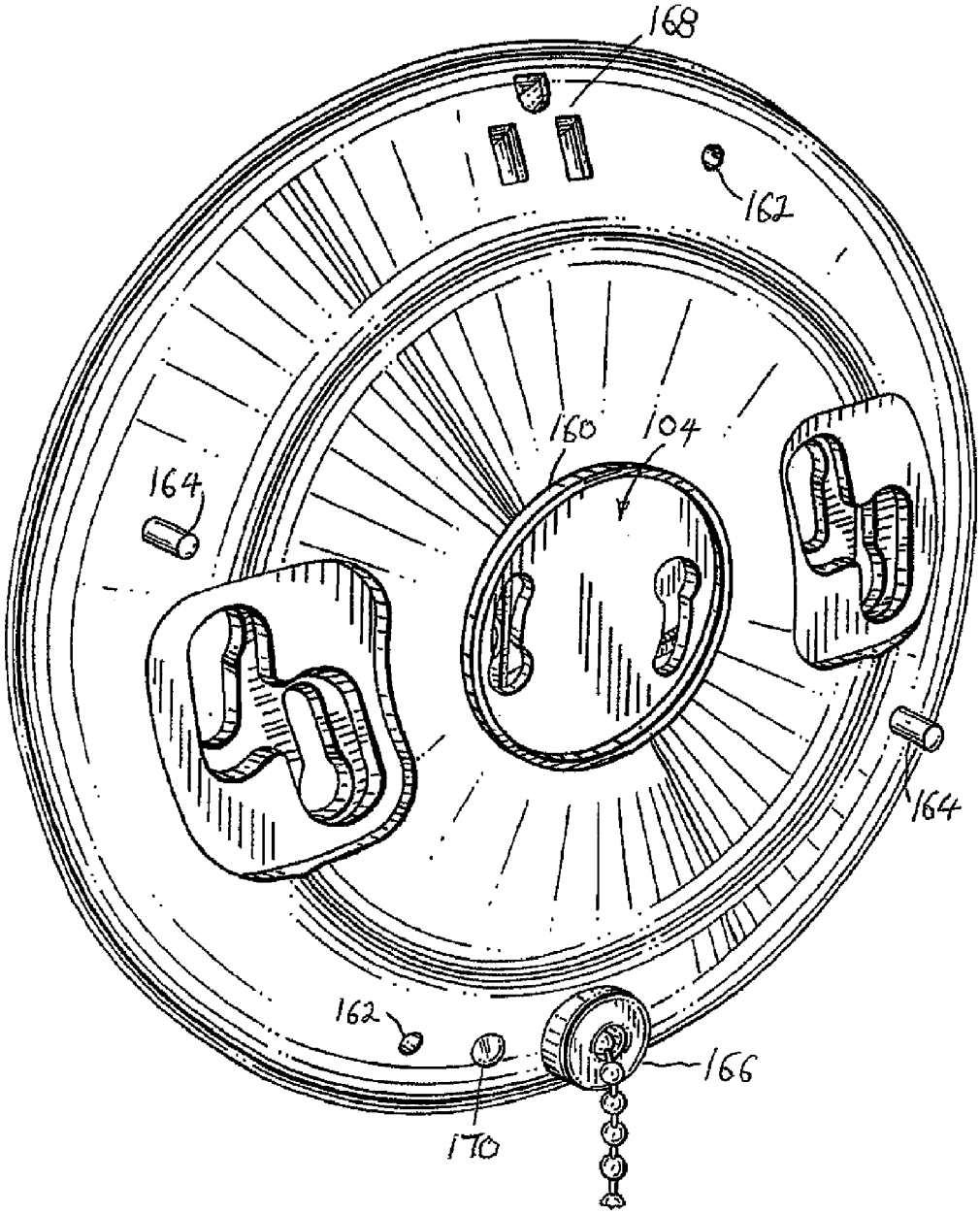
FIG. 11 is a top perspective view of the lampholder of FIG. 7 with a switch, a locator light and a grounding receptacle.

Referring to FIG. 11, there is disclosed a top perspective view of the lampholder of FIG. 7 with a switch 166, a grounding receptacle 168 and a locator light 170. Switch 166 can be a pull chain switch used to turn a lamp in the lampholder on and off, the grounding receptacle is provided as a convenience receptacle and the locator light helps a user locate the lampholder switch in the dark. The receptacle can be connected to be continuously on, or it can be connected to be turned on and off by the switch. The locator light is connected to be on continuously.

Figure 12:
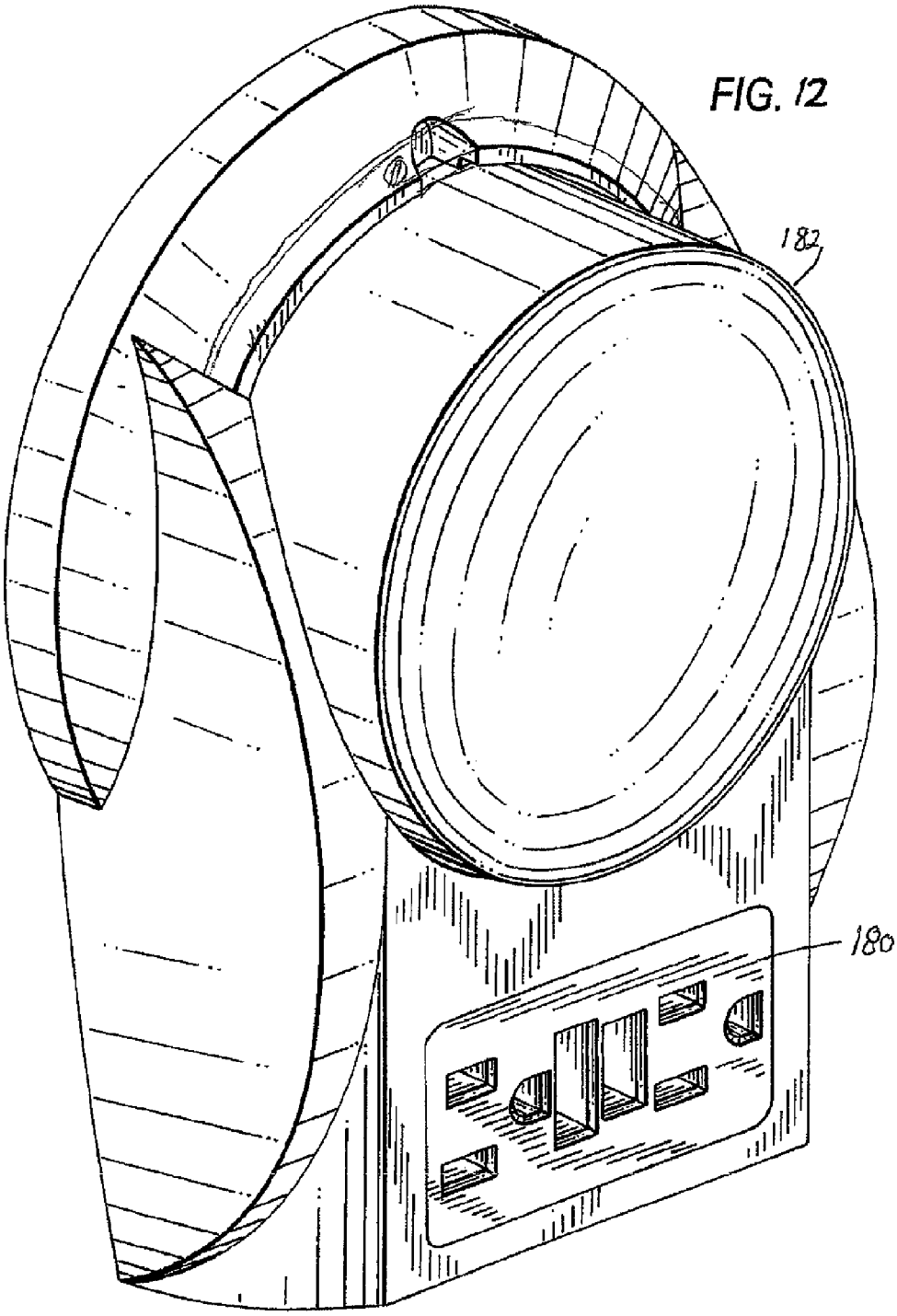
FIG. 12 is a top, side perspective view of another embodiment of the lampholder of FIG. 7 with a ground fault interrupter and a lamp cover.

Referring to FIG. 12, there is disclosed a top, side perspective view of another embodiment of a lampholder having a ground fault circuit interrupter and a lamp cover. The ground fault circuit interrupter 180 is provided as a convenience receptacle and the lamp cover 182 provides isolation for the lamp. The lamp cover can be clear or frosted to further defuse light from the lamp and is attached to the lampholder with screws which thread into openings located in the lampholder. The shape of the lampholder of FIG. 12 is configured to allow the ground fault circuit interrupter to be fitted into the lampholder. In all other aspects the lampholder of FIG. 12 is operationally similar to the lampholder of FIG. 7.

Figure 13:
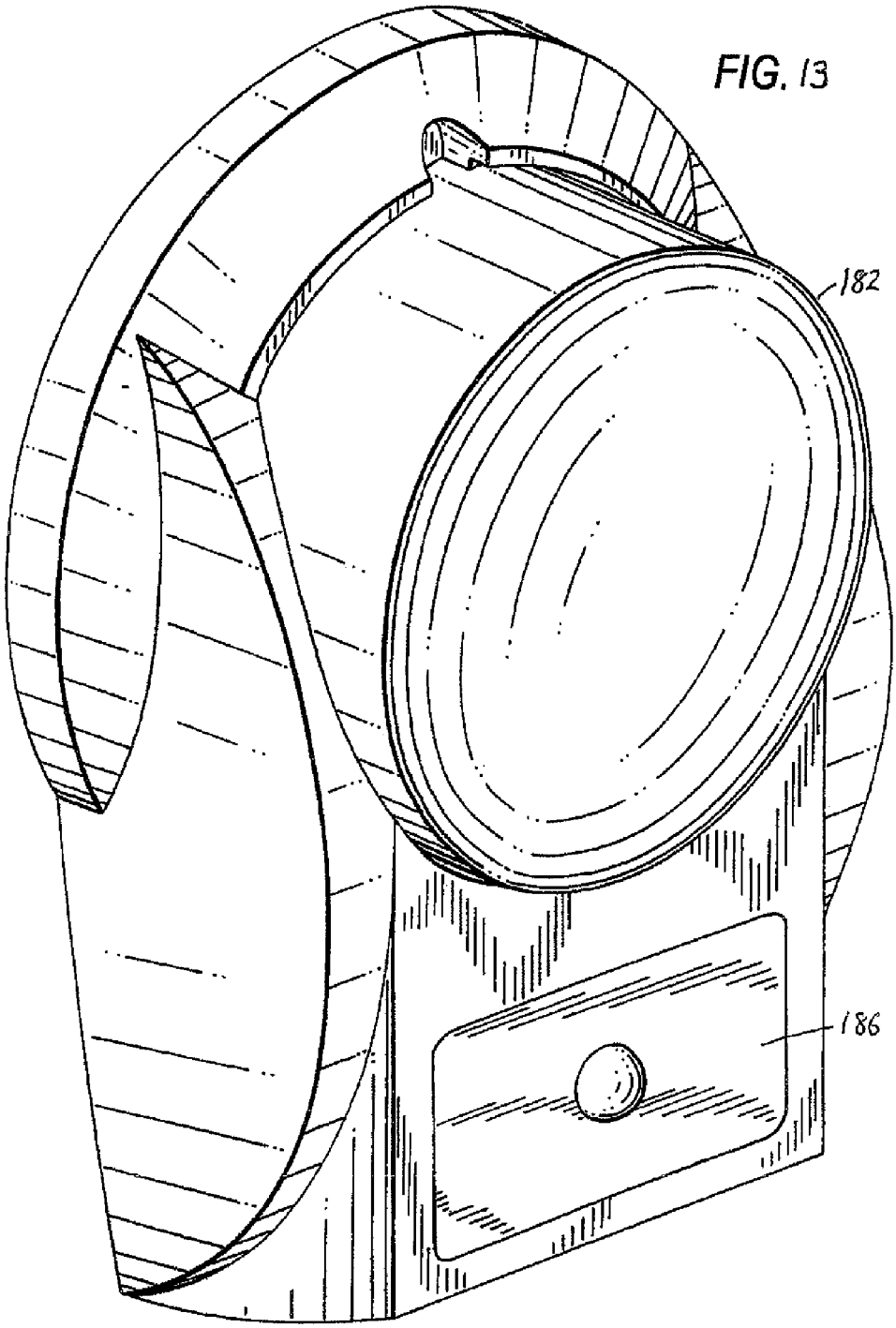
FIG. 13 is a top, side perspective view of another embodiment of the lampholder of FIG. 7 with an occupancy sensor and a lamp cover.

Referring to FIG. 13, there is disclosed a top, side perspective view of another embodiment of a lampholder having an occupancy sensor 186 and a lamp cover 182. The occupancy sensor can be connected to turn the lamp in the lampholder on and off and the lamp cover provides isolation for the lamp. The lamp cover can be clear or frosted to further defuse the light from the lamp and is attached to the lampholder with screws which thread into openings located in the lampholder. The lampholder of FIG. 13 is configured to allow the occupancy sensor to be fitted into the lampholder. In all other aspects the lampholder of FIG. 13 is operationally similar to the lampholder of FIG. 7.

While there have been shown and described and pointed out the fundamental novel features of the invention as applied to the preferred embodiments, it will be understood that various omissions and substitutions and changes of the form and details of the method and apparatus illustrated and in the operation may be done by those skilled in the art, without departing from the spirit of the invention.

What is claimed is:

1. A utility lampholder having at least one electrical connection element comprising;

a surface mountable member without any voltage transforming circuitry, said surface mountable member having a front surface disposed to receive a lamp and a rear surface;

a non-incandescent lamp cavity in said surface mountable member for receiving said lamp, said cavity extending away from said front surface and toward said rear surface, such that said cavity extends beyond a rear plane of the surface mountable member; and at least one aperture in said surface mountable member for receiving an electrical connection element of said lamp when said lamp is in said cavity.

2. The lampholder of claim 1 further comprising:

a first pair of keyholes located on a first center for coupling said lampholder to an outlet box of a first size.

3. The lampholder of claim 1, wherein said surface mounted member is disc shaped and has a diameter of between four and one-half and five and one half inches.

4. The lampholder of claim 1 further comprising:

a protrusion from said front surface of said surface mountable member positioned to inhibit lateral movement of a lamp during engagement of a lamp with said at least one aperture.

5. The lampholder of claim 4 wherein said protrusion is a ring shaped member encircling said at least one aperture and having a diameter dimensioned to restrict lateral movement of a lamp during engagement of a lamp with said at least one aperture.

6. The lampholder of claim 1 further comprising:

at least one electrical contact in said cavity and positioned to contact an electrical connection element of a lamp when inserted in said at least one aperture.

7. The lampholder of claim 6 further comprising:

a switch electrically connected to said at least one electrical contact.

8. The lampholder of claim 1 further comprising:

a grounding receptacle.

9. The lampholder of claim 1 further comprising:

a locator light.

10. The lampholder of claim 8 further comprising:

a ground fault circuit interrupter.

11. The lampholder of claim 1 further comprising:

a lamp cover releasably mountable to said surface mountable member.

12. The lampholder of claim 1 further comprising:

an occupancy sensor.

13. The lampholder of claim 2 further comprising:

a second pair of keyholes located on a second center for coupling said lampholder to an outlet box of a second size.

14. The lampholder of claim 1 wherein said surface mounted member has a plurality of apertures for receiving an ANSI GU24 type lamp.

15. The lampholder according to claim 1, wherein the lampholder does not contain a screwshell.

*16. An outlet box mounted fluorescent lampholder for accepting a fluorescent lamp, said lampholder comprising:*

*a surface mountable seat without any voltage transforming circuitry, said surface mountable seat comprising a top surface, a bottom surface and a substantially disc shaped body member, said disc shaped body member having a plurality of mounting keyholes that are adapted and configured for mounting said lampholder to said outlet box and a plurality of arcuate lamp contact keyholes that are adapted and configured to engage a plurality of contact pins of said fluorescent lamp wherein said surface mountable seat further comprises a ring configured to at least partially encircle said plurality of arcuate lamp contact keyholes;*

*a terminal mounting member coupled to said bottom surface of said surface mountable member, said terminal mounting member having a plurality of electrical contacts adapted and configured to engage a plurality of contact pins of said fluorescent lamp wherein said plurality of electrical contacts are arranged in alignment with said plurality of arcuate lamp contact keyholes.*

*17. The lampholder as in claim 16, wherein said terminal mounting member comprises an insulating material and at least one electrical path coupled to at least one of said plurality of electrical contacts.*

*18. The lampholder as in claim 17, wherein said at least one electrical path extends from a first face of said at least one electrical contact, to an opposite second face.*

*19. The lampholder as in claim 16, wherein at least one of said arcuate lamp contact keyholes comprises a circular end and an arc shaped slot end.*

*20. The lampholder as in claim 16, wherein the lampholder does not contain a screwshell.*

*21. The lampholder as in claim 16, wherein at least one of said plurality of electrical contacts comprises a spring based contact.*

*22. The lampholder as in claim 16, wherein said mounting keyholes are configured to receive a mounting screw.*

* * * * *